No. 649,719. Patented May 15, 1900.
C. E. DURYEA.
TIRE FOR VEHICLES.
(Application filed Mar. 13, 1893.)
(No Model.)
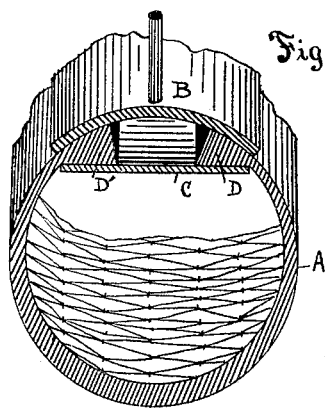
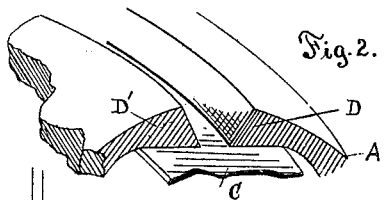
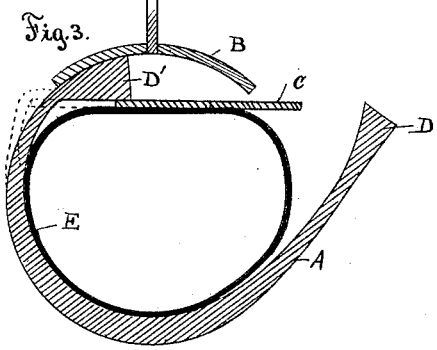
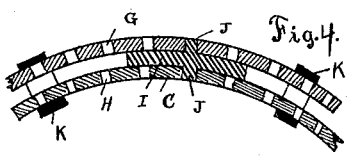
Witnesses.
L. M. Thurlow
A. Keithley
Inventor.
Charles E. Duryea.

United States Patent Office.

CHARLES E. DURYEA, OF PEORIA, ILLINOIS, ASSIGNOR TO THE INDIANA RUBBER AND INSULATED WIRE COMPANY, OF MARION, INDIANA.

TIRE FOR VEHICLES.

SPECIFICATION forming part of Letters Patent No. 649,719, dated May 15, 1900.

Application filed March 13, 1893. Serial No. 465,843. (No model.)

*To all whom it may concern:*

Be it known that I, CHARLES E. DURYEA, of Peoria, Illinois, (formerly of Springfield, Massachusetts,) have invented certain new and useful Improvements in Tires for Vehicles, of which the following is a full and complete description, reference being had to the accompanying drawings, which form a part of this specification.
This invention relates to improvements in pneumatic tires for bicycles and other wheels.

A favorite form of pneumatic tires now in use embody an inflatable tube to contain air under pressure and a protecting shoe or cover made separate from the inflatable tube and designed to inclose or partly inclose said air-tube, said shoe or cover being secured to a wheel rim or felly either by mechanical fastenings of various forms or by cementing within the tire-groove of an "ordinary" or concavo-convex rim.

Pneumatic tires, owing to their liability to puncture and leakage in use, are desirably secured to a rim in such manner as to admit of their ready removal for repairs and replacement "on the road" or when distant from a repair-shop by unskilled persons; and this end has been attained in a measure by the construction of what are known as "special" tires and rims—that is to say, tires having exteriorly-projecting ribs or lugs designed to interlock with edge grooves formed by overhanging lips or shoulders secured to or forming part of the special rim to be used with such tire. Among the numerous objections to the employment of such rims and tires is the expense of manufacturing the rims as compared with the ordinary concavo-convex rims, and, moreover, a rider to replace a damaged tire must procure a special tire to fit said special rim, often causing expense and delay to a rider aside from inconvenience and expense to dealers in carrying a very large stock of tires.
One object of my invention is to avoid the foregoing and other minor objections.

Another object of the invention is to construct a tire having a greater resilience, lighter weight, and greater durability than those at present in use.

Another object of the invention is to produce a tire of the general character above referred to which is adapted for use with all ordinary or concavo-convex rims and also with a number of the special rims now on the market.

With the above objects in view my invention consists in features of construction and arrangement which will be first described in detail and the novel features and combinations be then pointed out in the claims at the close of this specification.

In the accompanying drawings, Figure 1 is a transverse section through a rim and tire, illustrating features of my improvements. Fig. 2 is a perspective view of a section of the tire and its retaining-band. Fig. 3 is a transverse section illustrating the method of removing or replacing a tire. Fig. 4 is a sectional detail showing a means for adjusting the length of the retaining-band to suit rims of different diameters.

The air-tube A may be of any usual or preferred construction and is fitted, as usual, with an air-supply nozzle (not shown) by which said tube may be inflated or deflated, as occasion may require, and the rim or felly B may be of any desired width and construction, of wood or metal, as preferred. As shown, the tire-groove $b$ of the rim is a concave of unbroken surface; but it will be apparent that tires embodying the features of improvement to be described may be used in connection with a number of the forms of special rims now in use.

The tire cover or shoe D is constructed with enlarged edges $d$, designed to lie within the concavity of the rim and be retained therein by a securing-band C, located between said shoe D and the air-tube A. In the form shown in Fig. 1 the enlarged edges $d$ of the tire cover or shoe D are wedge-shaped in cross-section, the outer surface thereof following the arc of the concavity of the rim B, while the inner surface $d'$ lies in a plane substantially parallel with the chord of said arc, as shown, said inner surfaces $d'$ being in contact with the retaining band or bands C. This retaining-band C is of greater diameter than the greatest diameter of the wheel-rim B, so that it may be readily applied thereto or detached therefrom by a lateral movement, thus enabling the enlarged edges $d$ of the tire cover or shoe to be inserted between the wheel-rim B and the edge of the retaining-band C, as indicated in Fig. 3.

It will be noted that the wedge-shaped construction of the edges of the shoe B is advantageous as presenting a large amount of frictional surface to contact with the rim and retaining-band, so that upon inflation of the air-tube A the outward pressure of the air contained therein will serve to hold the tire-cover and retaining-band against possibility of dislodgment, while on the other hand upon deflation of the air-tube A a sidewise pressure upon the tire-cover, adjacent to one edge of the rim, will serve to move the retaining-band laterally a sufficient distance to permit of the removal of that edge of the tire-cover.

The retainers herein referred to may be made in one continuous piece or ring; but to adapt them for use with rims of different diameters I prefer to make them adjustable. To this end I have devised a special adjusting means. (Illustrated in Fig. 4.) This consists of a series of holes in each end of the band D so placed that one series will contain one hole more or less in a given length than the other series, which variation causes but one hole in each series to correspond at one time for the reception of the pin J and enables the band to be adjusted to a nicety. The pin is carried by a plate I, and the two ends of the band and the plate are maintained in position by the encircling slips K K.

I claim—

1. A retainer for pneumatic tires comprising a band provided at each end with a series of holes, the holes of one series varying in distance apart from those of the other series, and a stud to engage the holes of said opposite series, and terminate flush with the opposite surfaces of the band, substantially as described.

2. A retainer for pneumatic tires comprising a metal band provided at each end with a series of holes, the holes of one series varying in distance apart from that of the other series, and a plate located between the ends of the retainer and provided at opposite sides with studs adapted to fit the holes of the band, substantially as described.

3. A retainer for pneumatic tires comprising a band provided at each end with a series of holes, the holes of one series varying in distance apart from the holes of the other series, a plate located between the ends of the retainer and having oppositely-projecting pins to engage one hole of each series, and encircling clips for confining the ends of the band, substantially as described.

4. The combination with a wheel-rim having a tire-groove, of a tire-shoe having thickened edges to lie in the groove of the rim, and a retainer-band provided at each end with a series of holes, the holes of one series varying in distance apart from that of the other series, and a stud to engage the holes of said opposite series and terminate flush with the opposite surfaces of the band.

5. The combination with a wheel-rim having a tire-groove, of a tire-shoe having thickened edges to lie within the tire-groove of the rim, and a retainer comprising a metal band provided at its ends with a series of holes, the holes of one series differing in distances apart from those of the series, and a plate located between the ends of the retainer and provided at opposite sides with studs to engage the holes of the band.

Witness my hand.

CHARLES E. DURYEA.

Witnesses:
KNOWLTON P. DRYSDALE,
FRANK S. BEAVIS.